United States Patent [19]

Wahle et al.

[11] Patent Number: 4,690,998

[45] Date of Patent: Sep. 1, 1987

[54] SPECIAL EPOXY RESINS

[75] Inventors: Bernd Wahle, Kaarst; Dieter Freitag, Krefeld; Walter Uerdingen; Heinrich Heine, both of Leverkusen; Manfred Blazejak, Dusseldorf, all of Fed. Rep. of Germany

[73] Assignee: Bayer Aktiengesellschaft, Fed. Rep. of Germany

[21] Appl. No.: 829,205

[22] Filed: Feb. 14, 1986

[30] Foreign Application Priority Data

Feb. 23, 1985 [DE] Fed. Rep. of Germany ....... 3506519

[51] Int. Cl.$^4$ .................. C08G 59/00; C08G 65/08; C08G 65/14
[52] U.S. Cl. ........................... 528/96; 528/97; 528/98; 528/104
[58] Field of Search ............... 528/96, 97, 98, 104

[56] References Cited

U.S. PATENT DOCUMENTS

| | | | |
|---|---|---|---|
| 602,789 | 8/1960 | Bruin | 528/97 |
| 3,384,617 | 5/1968 | Casale et al. | 528/97 |
| 3,422,063 | 1/1969 | Barton et al. | 528/104 |
| 3,767,618 | 10/1973 | Hairston et al. | |

FOREIGN PATENT DOCUMENTS

| | | | |
|---|---|---|---|
| 2901665 | 7/1980 | Fed. Rep. of Germany | 528/97 |
| 2322161 | 3/1977 | France | |
| 814695 | 6/1959 | United Kingdom | 528/96 |

*Primary Examiner*—Harold D. Anderson
*Assistant Examiner*—Kriellion Morgan
*Attorney, Agent, or Firm*—Connolly & Hutz

[57] ABSTRACT

The invention relates to epxoy resins obtained by reaction of epichlorohydrin with selected mixtures of phenols for the production of thermosetting and cold-hardening moldings, coating compositions and adhesive compositions.

1 Claim, No Drawings

SPECIAL EPOXY RESINS

This invention relates to epoxy resins obtained by reaction of epichlorohydrin with selected mixtures of phenols for the production of thermosetting and cold-hardening moldings, coating compositions and adhesive compositions.

The reaction of polyhydric phenols, particularly 2,2-bis-(4-hydroxyphenyl)-propane (bisphenol A), with epichlorohydrin is the basic reaction for the production of epoxy resins (cf. for example "Epoxy Resins, Chemistry and Technology" by C. A. May and Y. Tanaka, Marcel Dekker, Inc., New York, 1973 and US-PS 3 121 727).

The epoxy resins thus produced are resistant to water, heat and chemicals and show high mechanical stability. Unfortunately, they are brittle and often show an undesirably high viscosity, which limits their ability to take up fillers and/or makes them difficult to process, and a tendency towards crystallization under the effect of the fillers introduced or under the effect of impurities, which necessitates the additional process step of melting before processing.

Numerous additives have been proposed for elasticizing epoxy resins, including for example those described in the pamphlet published by the B. F. Goodrich Comp., Cleveland, Ohio, USA, entitled: "Toughen Epoxy Resins with HYCAR ®RLP". Unfortunately, this is usually accompanied by a reduction in dimensional stability under heat and by an undesirable increase in viscosity.

One known method of reducing viscosity is to use so-called reactive diluents, generally monoepoxides of low viscosity (cf. for example "Epoxy Resins, Chemistry and Technology" loc. cit., pages 298 et seq). Unfortunately, this generally results in an undesirable reduction in the density of the network which in turn results in deterioration of the mechanical properties.

An epoxy resin system has now been found which has all the advantages of epoxy resins based on aromatic bisphenols, particularly bisphenol A, but which is distinguished by a lower viscosity and, hence, by a higher filler capacity, may readily be hardened with any of the hardeners normally used for epoxy resins and shows increased elasticity in the hardened moldings.

Accordingly, the present invention relates to epoxy resins which are characterized in that mixtures of various, in some cases isomeric, monohydric and polyhydric phenols in different ratios by weight to one another are used as the phenol component for the reaction with epichlorohydrin.

The epoxy resins obtainable in this way are distinguished before hardening by low viscosities which may be minimized by varying the ratios in which the phenols used are mixed. In some cases, mixtures containing standard hardeners in the usual quantities have lower viscosities than the state-of-the-art mixtures of epoxy resins based on bisphenol A. In the hardened state, their mechanical properties are comparable with or better than those of epoxy resins of pure bisphenol A and epichlorohydrin (diglycidylether of bisphenol A), despite the use of a reactive diluent.

The isomeric bis- and trisphenols which, in some cases, may optionally be substituted contain one or more phenolic OH groups. They are preferably reaction products of unsubstituted and also mono- and poly-substituted phenols with carbonyl compounds.

The isomeric bis- and trisphenols may be substituted, for example, by one or more alkyl groups containing from 1 to 10 carbon atoms and by one or more halogens, such as chlorine and bromine. The following phenols for example may be used: 2-methyl-, -cyclohexyl-, -isopropyl-, -tert-butyl-, 4-methyl-, -cyclohexyl-, -isopropyl-, tert.-butyl-, 2,3-dimethyl-, -cyclohexyl-, -isopropyl-, -tert.-butyl-, 2,4-dimethyl-, -cyclohexyl-, -isopropyl-, -tert.-butyl-, 2,5-dimethyl-, -cyclohexyl-, -isopropyl-, -tert.-butyl-, 2,6-dimethyl-, -cyclohexyl-, -isopropyl-, -tert.-butyl-, 2,3,5-trimethyl-, -isopropyl-, -tert.-butyl-, 2,3,6-trimethyl-, -isopropyl-, -tert.-butyl-, 2,4,5-trimethyl-, -isopropyl-, -tert.-butyl-, 2,3,4,5-tetramethyl-, -isopropyl-, 2,3,5,6-tetramethyl-, -isopropyl-, 2-chloro-, -bromo-, 3-chloro-, -bromo-, 4-chloro-, -bromo-, 2,3-dichloro-, -bromo-, 2,4-dichloro-, -bromo-, 2,5-dichloro-, -bromo-, 2,6-dichloro-, -bromo-, 2,3,5-trichloro-, 2,3,6-trichloro-, 2,4,5-trichloro-, 2-phenyl-, 4-phenyl-, 4-carboxyl-phenol-, 2-naphthol and preferably phenol.

Suitable carbonyl compounds are aldehydes and ketones, preferably ketones, such as for example: methylethyl-, methylpropyl-, methylisopropyl-, methylisobutyl-, methylpentyl-, diethyl-, ethylbutyl-, dibenzyl-, methyl-(4-fluorophenyl)-, methyl-(3,4-dichlorophenyl)-, trifluoromethylphenyl-, ethylphenyl-ketone, cyclopentanone, 2-methylcyclopentanone, cyclohexanone, 2-methyl-, 3-methyl-, 4-methyl-, 3,5-dimethyl-cyclohexanone, Dekalon, chloromethylmethylketone, bis-(chloromethyl)-ketone, bis-(dichlorofluoromethyl)-ketone, bis-(trifluoromethyl)-ketone, butanedione, 2,4-pentanedione, 2,5-hexanedione, benzil and, preferably, dimethylketone (acetone). The aldehydes used may be, for example, formaldehyde, ethanal, propanal, butanal, 2-methylpropanal, pentanal, hexanal, chloroacetaldehyde, 2,2,2-trichloroacetaldehyde, benzaldehyde, 2-chlorobenzaldehyde and, preferably, formaldehyde.

For example, the crude reaction products may be used without further purification, the presence of unidentified secondary products in a quantity of up to 10% by weight being of no consequence.

Thus, the following phenol components for example may be used in accordance with the invention:

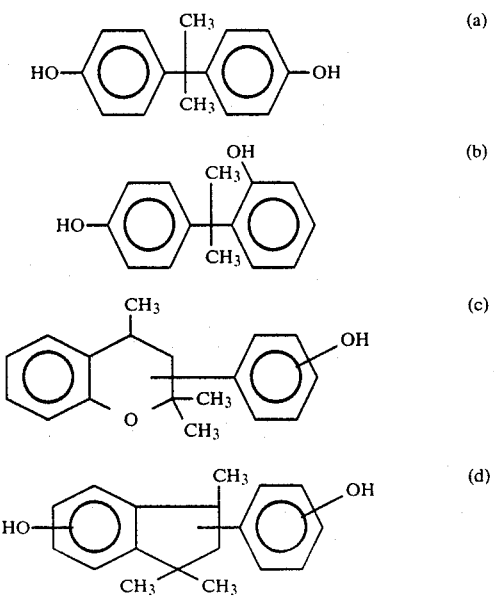

-continued

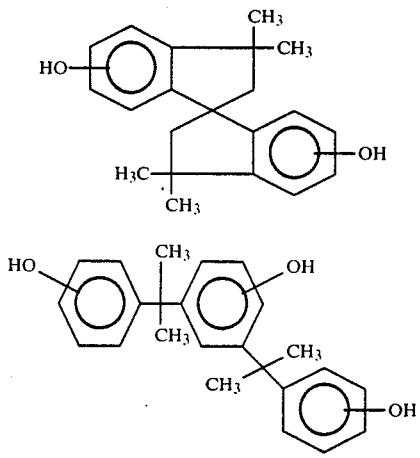

(e)

(f)

Components (a) to (f) are used in the following quantities, based on the total weight of the phenol component used:
(a) from 5 to 95% by weight,
(b) from 1 to 20% by weight,
(c) from 5 to 30% by weight,
(d) from 5 to 25% by weight,
(e) from 0.5 to 5% by weight,
(f) from 0.5 to 10% by weight.

From 0 to 10% by weight of phenol may optionally be added as component (g).

Using known methods, the epoxy resins according to the invention may optionally be processed with standard polycarboxylic acid anhydrides to form acid-anhydride-hardened moldings or with standard amines to form amine-hardened moldings.

Standard polycarboxylic acids anhydrides are understood to be aromatic, aliphatic and cycloaliphatic polycarboxylic acid anhydrides or mixtures thereof. Examples are phthalic acid anhydride, tetrahydrophthalic acid anhydride, hexachloroendomethylene tetrahydrophthalic acid anhydride, endomethylene tetrahydrophthalic acid anhydride, methylendomethylene tetrahydrophthalic acid anhydride, hexahydrophthalic acid anhydride, methylhexahydrophthalic acid anhydride, succinic acid anhydride, maleic acid anhydride, dodecenyl succinic acid anhydride, preferably liquid or low-melting (Mp. <60° C.) cycloaliphatic dicarboxylic acid anhydrides. Hexahydrophthalic acid anhydride and cis-3- and/or 4-methylhexahydrophthalic acid anhydride are particularly preferred.

Suitable amines are, for example, hexamethylene diamine, polyether diamines of polyalkylene glycolethers, of which the hydroxyl groups are replaced by primary amino groups, diethylene triamine, triethylene tetramine, tetraethylene pentamine, pentaethylene hexamine, dimethylaminopropylamine, aminoethylethanolamine, methadiamine, N-aminoethylpiperazine, diaminocyclohexane, 4,4'-diamino-3,3'-dimethyldicyclohexylmethane, isophorone diamine, m-xylylene diamine, tetrachloro-p-xylylene diamine, m-phenylene diamine, 4,4'-diaminodiphenylmethane, 4,4'-diaminodiphenylsulfone, 4-methyl-3,5-diaminobenzoic acid isopropylester, 3,3'-diethoxycarbonyl-4,4'-diaminodiphenylmethane, 2,6-diaminopyridine, substitution products of the above-mentioned compounds and also mixtures of two or more amines.

Suitable polyaminoamides are the usual condensation products of dicarboxylic acids and diamines.

EXAMPLE 1

311.2 g of a mixture of
55% by weight of 2,2-bis-(4-hydroxyphenyl)-propane,
10% by weight of 2-(2-hydroxyphenyl)-2-(4-hydroxyphenyl)-propane,
8% by weight of 1,1,3-trimethyl-3-(4-hydroxyphenyl)-chromane,
8% by weight of 1,1,3-trimethyl-3-(4-hydroxyphenyl)-6-hydroxyindane,
2% by weight of 1,1'-(3,3,3',3'-tetramethyl-6,6'-dihydroxy)-spiro-bis-indane,
7% by weight of 2-(4-hydroxyphenyl)-2-[4-hydroxy-5-(2-{4-hydroxyphenyl}-2-propylidenyl)-phenyl]-propane and
10% by weight of phenol
having an OH number of 468 mg KOH/g substance, i.e. 1 mole of phenolic OH groups in 119.7 g of the above phenol mixture, are introduced into 1202.5 ml (13 moles) of epichlorohydrin and 46 g of methanol and heated to boiling temperature (approx. 95° C.). Under these conditions, 115.5 g of solid NaOH are added in 10 equal portions in such a way that the heat of the exothermic reaction keeps the reaction mixture boiling so that the heating may be removed. On completion of the addition, the mixture is left to boil for another 2 hours, after which excess epichlorohydrin, methanol and water of reaction are distilled off in vacuo to a maximum sump temperature of 90° C. 320 g of toluene and 580 g of water are then added with stirring, after which the mixture is stirred for 15 minutes at room temperature, left to settle for about 30 minutes and the aqueous phase separated off. The organic phase is washed with $NaH_2PO_4$ solution to a pH-value of $\leq 6$. The toluene is distilled off under a vacuum of from 70 to 100 mbar. Towards the end of distillation, the vacuum is reduced to $\leq 10$ mbar and the sump temperature increased to 140° C. At that temperature, the sump product is purged for 3 hours with a vigorous stream of nitrogen and filtered without cooling. The product obtained has the following data:
Viscosity: 5.9 Pa.s (25° C.)
Equivalent weight: 190 g
Chlorine content: 0.5%

EXAMPLE 2

(Comparison Example)

296.4 g (1.3 moles) of 2,2-bis-(4-hydroxyphenyl)-propane ("bisphenol A") are reacted with 1202.5 g (13 moles) of epichlorohydrin as in Example 1 to form the epoxy resin. The product thus obtained has the following data:
Viscosity: 10.1 Pa.s (25° C.)
Equivalent weight: 185 g
Chlorine content: 0.5%

Production of Acid-Anhydride-Hardened Moldings

EXAMPLE 3

70 parts by weight of hexahydrophthalic acid anhydride and 1 part by weight of dimethylbenzylamine are added at 60° C. to 100 parts by weight of the epoxy resin obtained in accordance with Example 1. After complete dissolution, a vacuum of 3 mbar is applied until all the bubbles have disappeared, after which the resin is cast to form 4 mm thick plates which are then prehardened for 4 hours at 80° C. and then fully hardened for 16 hours at 120° C.

The standard bars requires for measuring the mechanical properties are cut from these plates. Tensile strength and braking elongation are determined in accordance with DIN 53 455, modulus of elasticity in accordance with DIN 53 457, flexural strength and peripheral fiber elongation in accordance with DIN 53 452, impact strength in accordance with DIN 53 453, ball indentation hardness in accordance with DIN 53 436 and dimensional stability under heat (Martens) in accordance with DIN 53 458. The results are shown in Table 1.

EXAMPLE 4

(Comparison Example)

The epoxy resin obtained in accordance with Example 2 is cast as in Example 3 to form plates which are then hardened. The resulting mechanical properties are also shown in Table 1.

The moldings obtained from the new epoxy resins after hardening with acid anhydrides are distinguished by increased elasticity, as reflected in particular in the distinctly increased peripheral fiber elongation.

Production of Amine-Hardened Moldings

EXAMPLE 5

20 parts by weight of pentaethylene hexamine are added at room temperature to 100 parts by weight of the epoxy resin of Example 1 and the clear solution cast to form 4 mm thick plates. The plates obtained are hardened for 24 hours at room temperature and then tempered for 3 hours at 120° C. The standard bars required for measuring mechanical properties are cut from these plates. The results are shown in Table 2.

EXAMPLE 6

(Comparison Example)

The epoxy resin obtained in accordance with Example 2 is cast as in Example 5 to form plates which are then hardened. The resulting mechanical properties are also shown in Table 2.

The moldings obtained from the new epoxy resins after hardening with amines are distinguished by improvements in their mechanical properties.

TABLE 1

| Mechanical properties of moldings hardened with acid anhydrides | | | |
|---|---|---|---|
| | | Example 3 | Example 4 (Comparison Example) |
| Tensile strength | (MPa) | 91 | 92 |
| Breaking elongation | (%) | 4.2 | 3.2 |
| E-modulus | (MPa) | 3375 | 2550 |
| Flexural strength | (MPa) | 145 | 140 |
| Peripheral fiber elongation | (%) | 6.0 | 3.5 |
| Impact strength | (kJ/m²) | 180 | 180 |
| Dimensional stability under heat (Martens) | (°C.) | 100 | 115 |

TABLE 2

| Mechanical properties of amine-hardened moldings | | | |
|---|---|---|---|
| | | Example 5 | Example 6 (Comparison Example) |
| Tensile strength | (MPa) | 87 | 39 |

TABLE 2-continued

| Mechanical properties of amine-hardened moldings | | | |
|---|---|---|---|
| | | Example 5 | Example 6 (Comparison Example) |
| Breaking elongation | (%) | 5.1 | 2.5 |
| E-modulus | (MPa) | 3355 | 2530 |
| Flexural strength | (MPa) | 139 | 88 |
| Peripheral fiber elongation | (%) | 6.3 | 4.5 |
| Impact strength | (kJ/m²) | 24.8 | 14.0 |
| Ball indentation hardness | (MPa) | 170 | 130 |
| Dimensional stability under heat (Martens) | (°C.) | 95 | 110 |

We claim:
1. An epoxy resin which is the reaction product of epichlorohydrin and a phenolic mixture wherein the phenolic mixture is:

from 5 to 95% by weight of 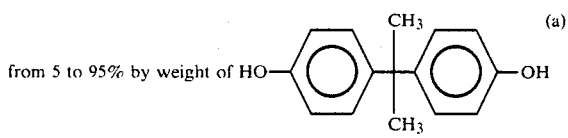 (a)

from 1 to 20% by weight of 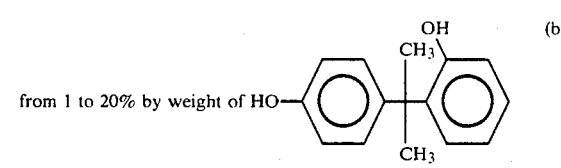 (b)

from 5 to 30% by weight of 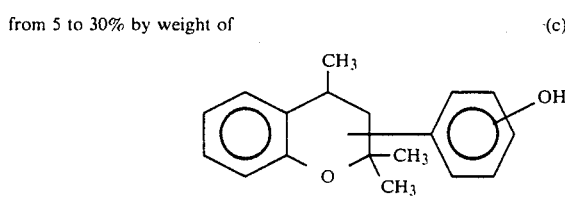 (c)

from 5 to 25% by weight of 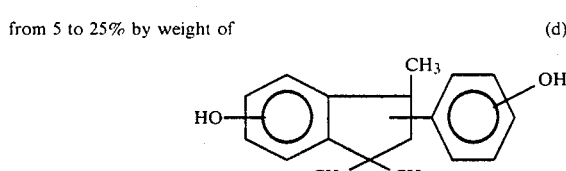 (d)

from 0.5 to 5% by weight of 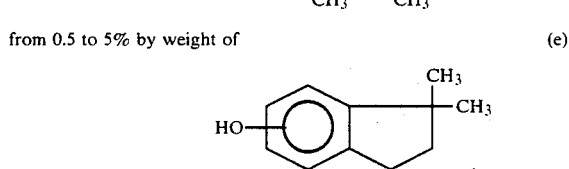 (e)

from 0.5 to 10% by weight of 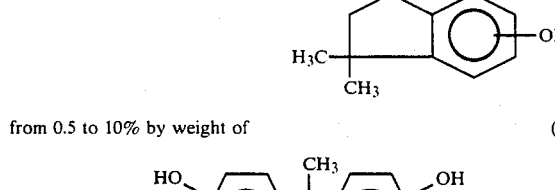 (f)

and
from 0 to 10% by weight of phenol. (g)

* * * * *